(12) United States Patent
Peterson et al.

(10) Patent No.: US 9,822,589 B2
(45) Date of Patent: Nov. 21, 2017

(54) ROTARY DRILL BIT AIR/WATER SEPARATOR

(71) Applicant: ATLAS COPCO SECOROC LLC, Grand Prairie, TX (US)

(72) Inventors: Gregory Wayne Peterson, Mesa, AZ (US); Srinidni Bangalore Gopalakrishna, Bengalura (IN); Austen Morgan Schwend, Troutville, VA (US)

(73) Assignee: Atlas Copco Secoroc LLC, Grand Prairie, TX (US)

( * ) Notice: Subject to any disclaimer, the term of this patent is extended or adjusted under 35 U.S.C. 154(b) by 284 days.

(21) Appl. No.: 14/561,670

(22) Filed: Dec. 5, 2014

(65) Prior Publication Data

US 2016/0160569 A1    Jun. 9, 2016

(51) Int. Cl.
*E21B 10/23*  (2006.01)
*E21B 21/00*  (2006.01)
*B01D 45/06*  (2006.01)

(52) U.S. Cl.
CPC ............ *E21B 10/23* (2013.01); *E21B 21/002* (2013.01); *B01D 45/06* (2013.01)

(58) Field of Classification Search
CPC ........ E21B 10/23; E21B 21/002; B01D 45/06
USPC .......................................................... 55/463
See application file for complete search history.

(56) References Cited

U.S. PATENT DOCUMENTS

| | | |
|---|---|---|
| 1,854,583 A | 4/1932 | Friedrich |
| 2,861,780 A | 11/1958 | Butler |
| 2,920,872 A | 1/1960 | Baur et al. |
| 3,788,408 A | 1/1974 | Dysart |
| 3,924,695 A | 12/1975 | Kennedy |
| 4,154,313 A | 5/1979 | Dysart et al. |

(Continued)

FOREIGN PATENT DOCUMENTS

| | | |
|---|---|---|
| AU | 2005/287828 | 3/2006 |
| CA | 2535141 | 8/2007 |

(Continued)

OTHER PUBLICATIONS

International Search Report issued in corresponding International Application No. PCT/US2015/062178 dated Apr. 26, 2016 (5 pages).

(Continued)

*Primary Examiner* — George Gray
(74) *Attorney, Agent, or Firm* — Jeffri Kaminski; Venable LLP

(57) ABSTRACT

An air/water separator including a first hollow member configured to receive a flow including an air and water mixture and a second hollow member configured to receive the flow from the first hollow member. An exit of the first hollow member extends into an opening of the second hollow member such that the exit of the first hollow member axially overlaps the opening of the second hollow member, thereby creating a first flow path from the interior of the first hollow member to the outside of the second hollow member including two turns about the exit of the first hollow member and opening of the second hollow member, and a second flow path from the first hollow member through the second hollow member.

20 Claims, 11 Drawing Sheets

(56) References Cited

U.S. PATENT DOCUMENTS

| | | | |
|---|---|---|---|
| 4,184,554 A * | 1/1980 | Levefelt | E21B 21/10 137/541 |
| 4,245,710 A | 1/1981 | Dolezal et al. | |
| 4,316,728 A | 2/1982 | Caesar | |
| 4,457,384 A * | 7/1984 | Layton | E21B 21/002 175/318 |
| 4,515,229 A | 5/1985 | Drummond et al. | |
| 5,012,876 A * | 5/1991 | Bruchmiller | E21B 10/18 175/318 |
| 5,139,095 A | 8/1992 | Lyon et al. | |
| 5,143,162 A | 9/1992 | Lyon et al. | |
| 5,240,083 A | 8/1993 | Lyon | |
| 5,490,571 A | 2/1996 | Hanns et al. | |
| 5,682,957 A | 11/1997 | Lyon | |
| 5,775,443 A * | 7/1998 | Lott | E21B 10/18 175/340 |
| 5,800,582 A | 9/1998 | Palmer et al. | |
| 6,408,957 B1 * | 6/2002 | Slaughter, Jr. | E21B 21/002 175/235 |
| 2003/0116357 A1 | 6/2003 | Peterson et al. | |
| 2007/0187152 A1 | 8/2007 | Brodie et al. | |
| 2010/0258353 A1 | 10/2010 | Lowry | |
| 2013/0319323 A1 * | 12/2013 | Hermann | B05B 15/1259 118/600 |

FOREIGN PATENT DOCUMENTS

| | | |
|---|---|---|
| EP | 0106700 | 4/1984 |
| EP | 107475 | 5/1984 |
| EP | 2671647 A1 | 12/2013 |
| GB | 1081928 | 9/1967 |

OTHER PUBLICATIONS

Written Opinion issued in corresponding International Application No. PCT/US2015/062178 dated Jun. 9, 2016 (7 pages).

International Preliminary Report on Patentability issued in corresponding International Application No. PCT/US2015/062178 dated Jun. 6, 2017 (8 pages).

* cited by examiner

ROTARY DRILL BIT AIR/WATER SEPARATOR

FIELD OF THE INVENTION

The invention relates to structures for use with rotary earth boring drill bits. In particular, the invention relates to an air/water separator.

BACKGROUND OF THE INVENTION

During earth drilling air may be utilized as a drilling fluid. Along with air injected into the drilling apparatus, water may be introduced to suppress dust generated during the drilling. There may be a desire to separate the flow of air and water. One reason for this is that the water may be acidic. As a result, the water may have a corrosive effect on the bearings utilized in a drill bit. This can shorten the life of the bearings and, hence, the drill bit, requiring replacement of the bit. Of course, when the bit needs to be replaced the drill is not being utilized, this costs time and money to replace the bit and also takes a drilling rig out of productive use. It is desirable to remove as much water as possible from the flow of air to bearings, while directing the remaining air and separated water flow to the nozzles of the bit.

A typical apparatus utilized to separate air and water may utilize centrifugal force to separate the water from the air by directing the water away from inlets of bearings of a bit. One apparatus utilizing centrifugal force may include a plurality of vanes 1 including flat blades, shown in FIGS. 1A and 1B. A dome 3 may be arranged in the center of the vane assembly. Inlets 5 for air-tubes 7 to direct air toward bearings of the bit are arranged about one inch below the dome 3, as shown in FIG. 2B. The vanes 1 cause the water to flow outwardly toward the outer diameter of the bit. Water in the air flow cannot turn up, around and down the air-tubes 7 of the bit. FIGS. 2A and 2B illustrate such an arrangement installed in a bit. As shown in FIG. 1A, the vanes 1 are arranged at a relatively abrupt angle so as to accelerate flow over the vanes 1.

FIG. 3 illustrates another existing solution to separate the water and air in flushing medium. The separator shown in FIG. 3 is inserted in a drill string adjacent a drill bit. The structure shown in FIG. 3 operates by forcing the liquid portion of the flushing medium outwardly through centrifugal force, as indicated by the outward directed arrows. On the other hand, the gaseous portion of the flushing medium flows down through the central passage of the structure. This structure includes large sections that decrease the flow area for the air and liquid.

Existing solutions have a number of associated problems. For example, the blades in a centrifugal force separator cause a sudden acceleration of the air/water flow, which can generate a large back pressure above certain flow volumes of air. Back pressure can be considered as a pressure drop across the device. Many flow components reference pressure drop since a minimum pressure must be maintained. The existing centrifugal air/water separator utilized in a 6⅝" API connection bit is limited to a flow of about 2700 scfm. This flow rate produces a back pressure of about 20 psi. Back-pressure can cause problems with the compressor generating the air flow. As a result, the air flow may need to be reduced below a rate that is functional for the bit.

To help reduce back pressure, open areas 11 were included between the vanes, shown in FIGS. 1B and 2A, to produce an open flow. However, even with the open areas, back pressure is still a problem. Once the open areas are increased enough to adequately lower back pressure the separator no longer provides enough centrifugal force to move the water outward away from the air-tube inlets under the dome.

SUMMARY OF THE INVENTION

Embodiments of the invention include an air/water separator including a first hollow member configured to receive a flow including an air and water mixture and a second hollow member configured to receive the flow from the first hollow member. An exit of the first hollow member extends into an opening of the second hollow member such that the exit of the first hollow member axially overlaps the opening of the second hollow member, thereby creating a first flow path from the interior of the first hollow member to the outside of the second hollow member including two turns about the exit of the first hollow member and opening of the second hollow member, and a second flow path from the first hollow member through the second hollow member.

Additionally, embodiments of the invention include a drill bit including a pin connection, an air/water separator arranged in the pin connection.

Furthermore embodiments of the invention including a drill string, a drill bit and an air/water separator.

Also, embodiments of the invention include a method for drilling including directing flow of air and water through an air/water separator.

Still other objects and advantages of the present invention will become readily apparent by those skilled in the art from the following detailed description, wherein is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The above-mentioned objects and advantages of the present invention will be more clearly understood when considered in conjunction with the accompanying drawings, in which.

DETAILED DESCRIPTION OF EMBODIMENTS OF THE INVENTION

Figure 1A:
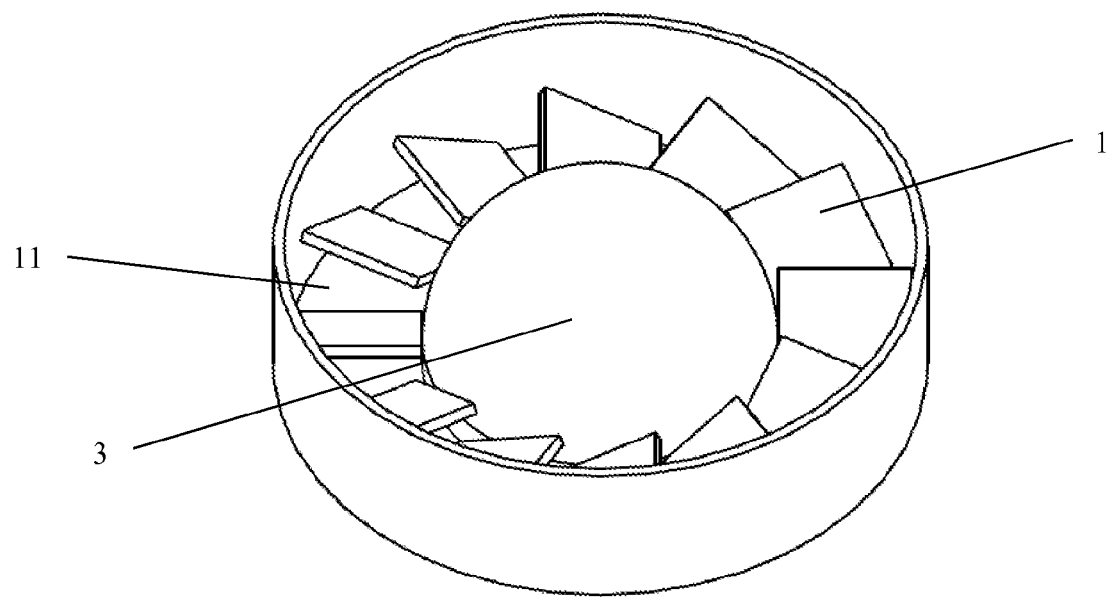
FIG. 1A represents a perspective view of a known air/water separator device.
Figure 1B:
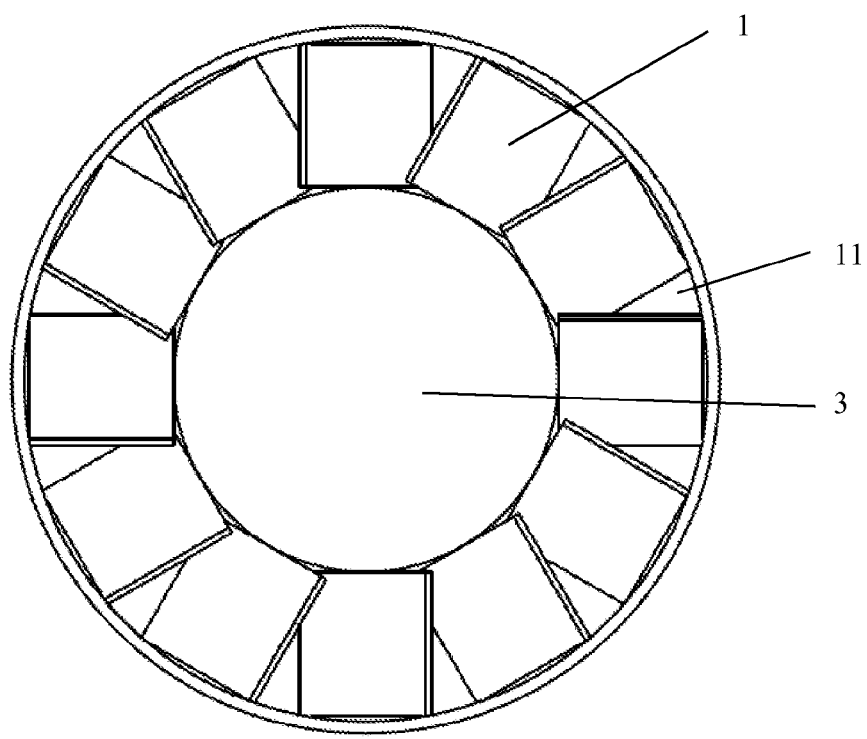
FIG. 1B represents an overhead view of the device shown in FIG. 1A.
Figure 2A:
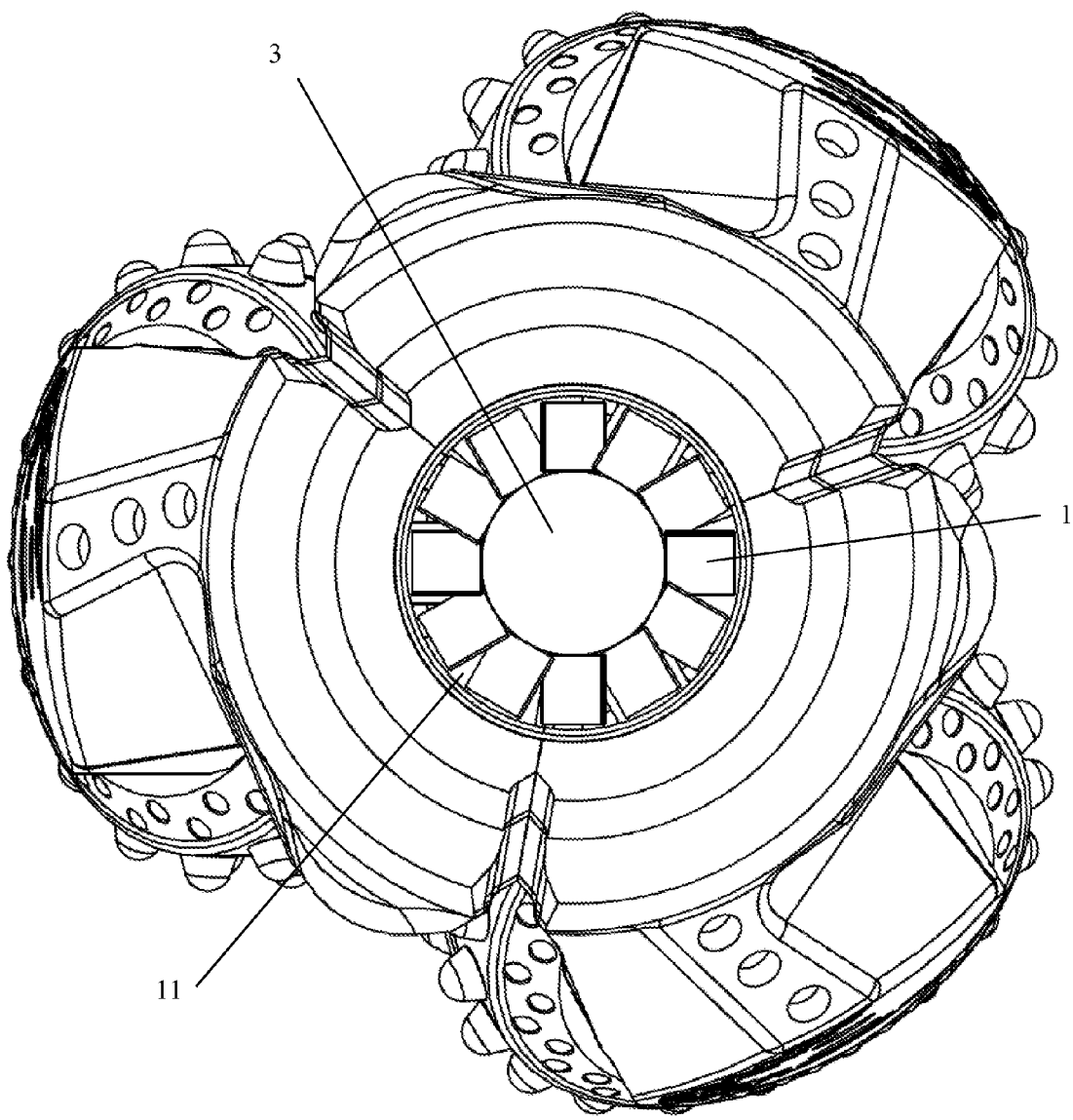
FIG. 2A represents an overhead view of the device shown in FIGS. 1A and 1B installed in a rotary drill bit.
Figure 2B:
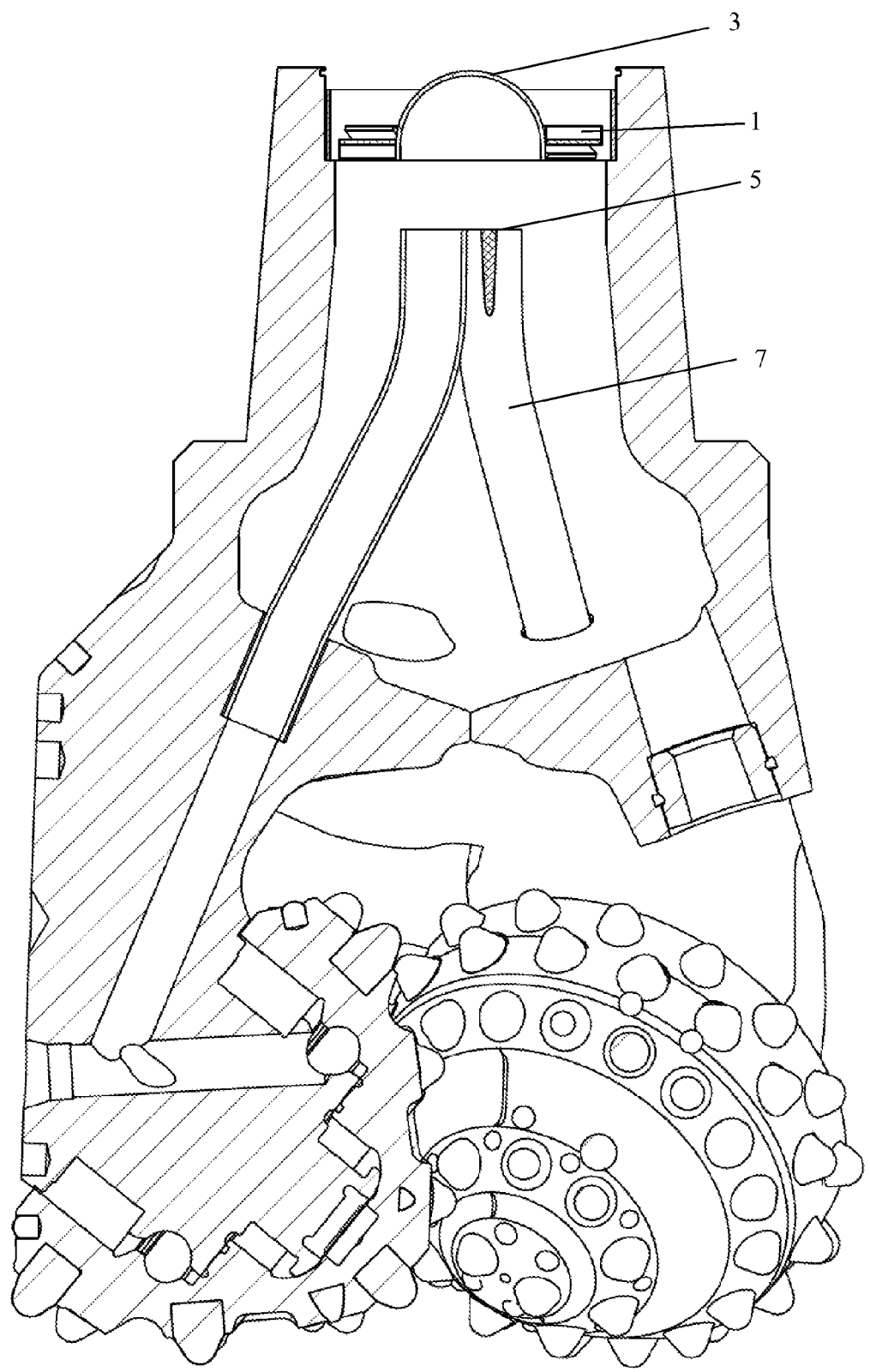
FIG. 2B represents a cross-sectional view of the structure shown in FIG. 2A.
Figure 3:
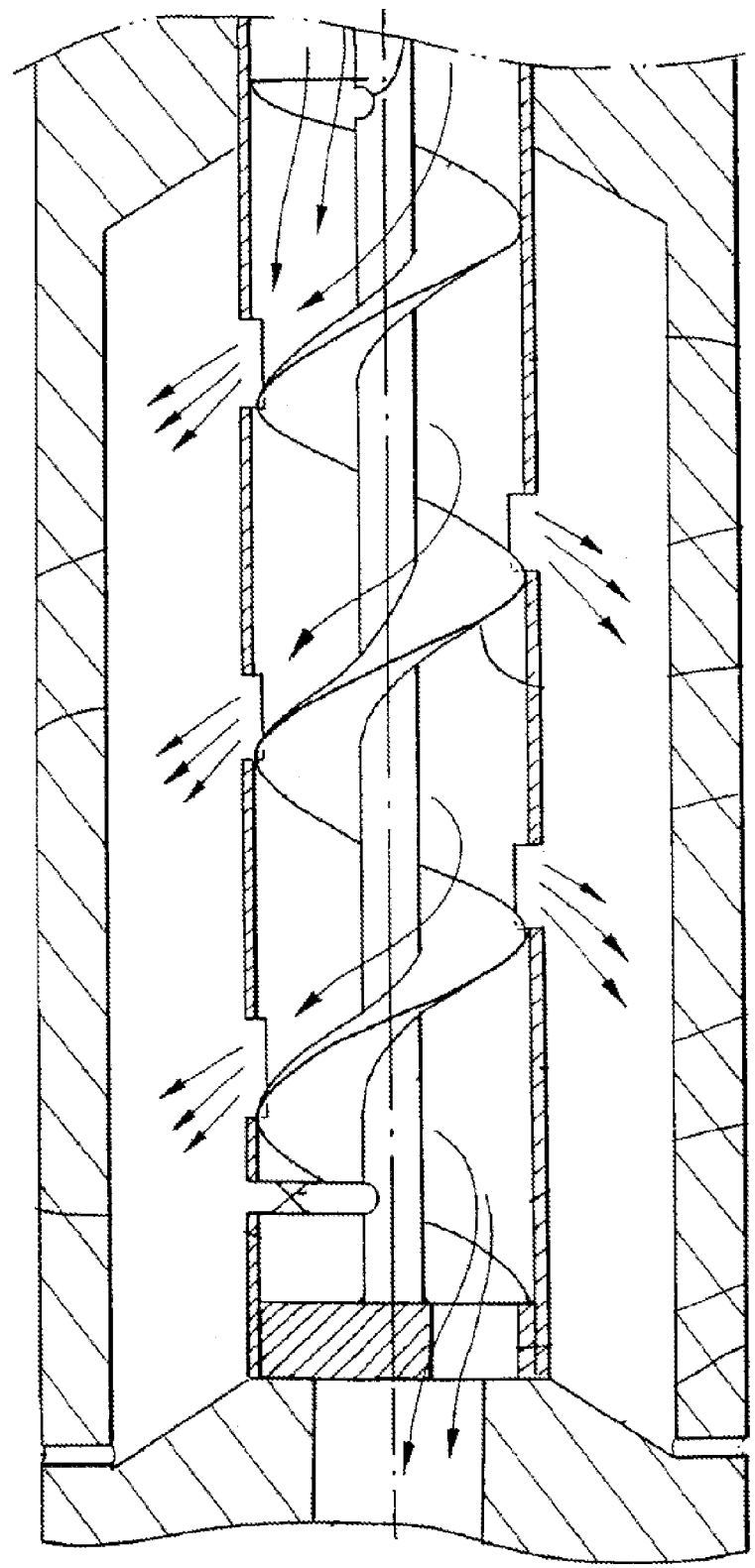
FIG. 3 represents a cross-sectional view of another known air/water separator device.

Embodiments of the invention provide a unique, simple and elegant solution to problems related to existing air/water separators. The air/water separator may include no moving parts, such as hinges or springs. Additionally, the air/water separator may generate a much lower back pressure than currently utilized structures.

Another benefit of embodiments of the air/water separator is that it may be inserted into existing bit structures without requiring any modification to the bit structure other than machining the bore of the pin connection. Also, the structure of embodiments of the air/water separator permits pressure in the bit to be tuned by adjusting size of the bit nozzles, providing a much better control of the flow of air and water through the bit. Furthermore, embodiments of the air/water separator may be scaled up or scaled down for various sized bits.

In its simplest form, an air/water separator according to the invention typically includes two at least partially nested hollow members. The hollow members are arranged such that a lower end of an upper of the hollow members at least partially extends into an upper end of a lower of the hollow members such that the lower end of the upper of the hollow members is not coplanar with the upper end of a lower of the hollow members. Additionally, in the region with the two hollow members overlap, a gap is present between the outer wall of the upper hollow member and the inner wall of the lower hollow member.

The inner surfaces of the hollow members may have a variety of contours. For example, the inner surfaces may be substantially cylindrical. Along these lines, the inner surfaces may be cylindrical or vary within a few degrees of being perfectly cylindrical. The inner surfaces may also be frustoconical, up to an angle of about 70°. According to other examples, the hollow members have inner surfaces contoured as funnels.

While the contour of the inner surfaces of the hollow members may be the same over their entire areas, the inner surfaces may have a plurality of contours. Regions of different contours may meet at a sharp, defined angle. The contour of the inner surface of the hollow members may also gradually curve between two regions having different contours. Additionally, regions of the inner surfaces of the may include flat and/or curved sections. For example, a hollow member having a conical inner surface may be flat. Alternatively, the inner surface could curve inwardly or outwardly. It is not necessary that the upper and lower hollow members have the same contour; the contours of the inner surfaces may be different.

The air/water separator may include more than two hollow members or more than one pair of hollow members. It is possible that any combination of hollow members may be utilized. For example, a funnel may be utilized with a converging cylinder. While the discussion below relates to one particular embodiment including two hollow members that are funnels, this is meant to be illustrative. Other hollow members having different shapes and contours of inner surfaces could be substituted for the funnel(s).

Regardless of the shape of the hollow members, the flow path, or first flow path, between the exit of the first, or upper, hollow member and entrance of the second, or lower, hollow member may about 10% to about 40% of the smallest flow area of the first hollow member. Typically, the smallest flow area is present at the exit of the first hollow member.

A second flow path out of the base of the second hollow member may be about 60% to about 90% of smallest flow area of the first hollow member. Typically, the inlet of the second hollow member is larger than the exit of the first hollow member. Additionally, the minimum flow area of the second hollow member is typically less than the minimum flow area of the first hollow member. Further, the flow area of the first flow path is typically larger than combined flow area to the bearings of the bit in which the air/water separator is incorporated and the flow area of the second flow path is typically larger than combined flow area through the nozzles of the bit in which the air/water separator is incorporated. A hollow member that is a funnel may have a converging angle that may be from about 0°, in other words, cylindrical, to about 70° depending on the embodiment or bit size. Any of these dimensions, shapes, angles and other parameters of the air/water separator may vary depending upon the size of the bit, flow rate, and other factors.

Figure 4:
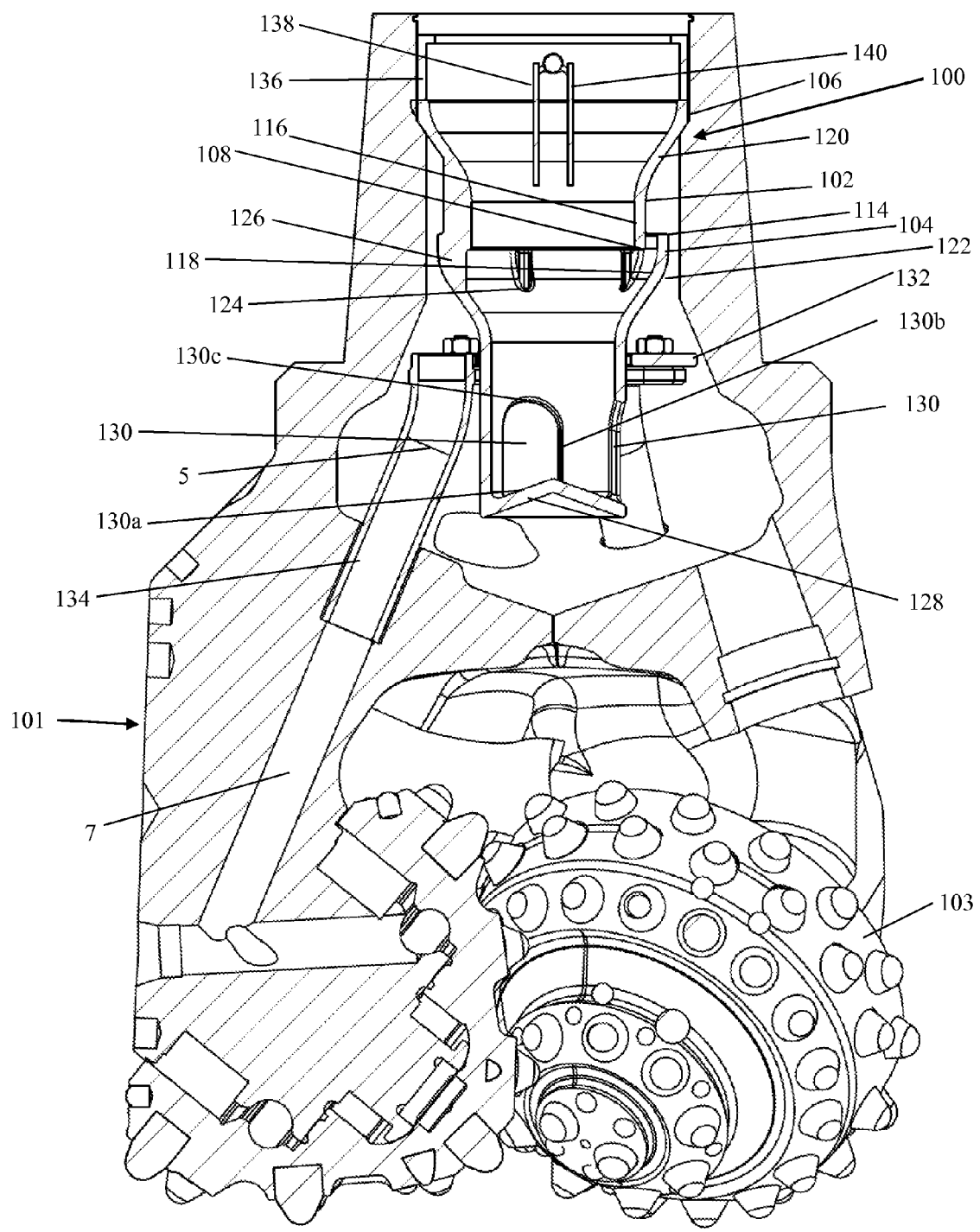
FIG. 4 a cross-sectional view of an embodiment of an air/water separator installed in an embodiment of a rotary drill bit.

FIG. 4 shows an embodiment of an air/water separator 100 including a first funnel 102 and a second funnel 104 installed in a drill bit 101 including three cones 103. Although a tri-cone bit is illustrated and described herein, the air/water separator may be utilized with any bit, rotary, non-rotary or otherwise. The air/water separator is particularly useful with bits that include bearings to help divert water and/or debris away from the bearings. Modifications may need to be made to the air/water separator and/or the bit to make the air/water separator and bit structures compatible. It may also be possible to incorporate the air/water separator elsewhere in a drilling assembly structure.

Typically, the first funnel 102 has an entry 106 having a larger inner diameter than an inner diameter of the entry of the second funnel 104. Similarly, the first funnel typically has an exit 108 having a larger inner diameter than an exit 112 of the second funnel 104. The diameter of the first funnel 102 and second funnel 104 may depend at least in part upon the size of the drill bit into which the air/water separator is installed.

The first funnel 102 and the second funnel 104 may have any suitable interior contour. The interior contour of the first funnel 102 and/or the second funnel 104 may vary depending at least in part upon a desired increase in velocity in air and water flowing through each funnel. The interior contour of the first funnel and the second funnel may vary from being almost cylindrical, with little variation in the contour among the various sections of the interior surface of the funnel(s). The first funnel 102 and the second funnel 104 of the embodiment shown in FIG. 4 each include an entry section, an inclined section and an exit section. The exit section of each funnel is generally cylindrical but may vary within some degrees of cylindrical. The reduced cross-sectional area reduces the flow area and accelerates the flow through the reduced flow area.

The first funnel includes an opening 106 and an exit 108. Similarly, the second funnel includes an opening 110 and an exit 112. As shown in FIG. 4, the exit 108 of the first funnel 102 is located within the entry 110 of the second funnel 104 such that the exit 108 of the first funnel 102 is not coplanar with the entry 110 of the second funnel 104. The distance that the first funnel extends into the second funnel may vary depending upon the embodiment.

Figure 6:
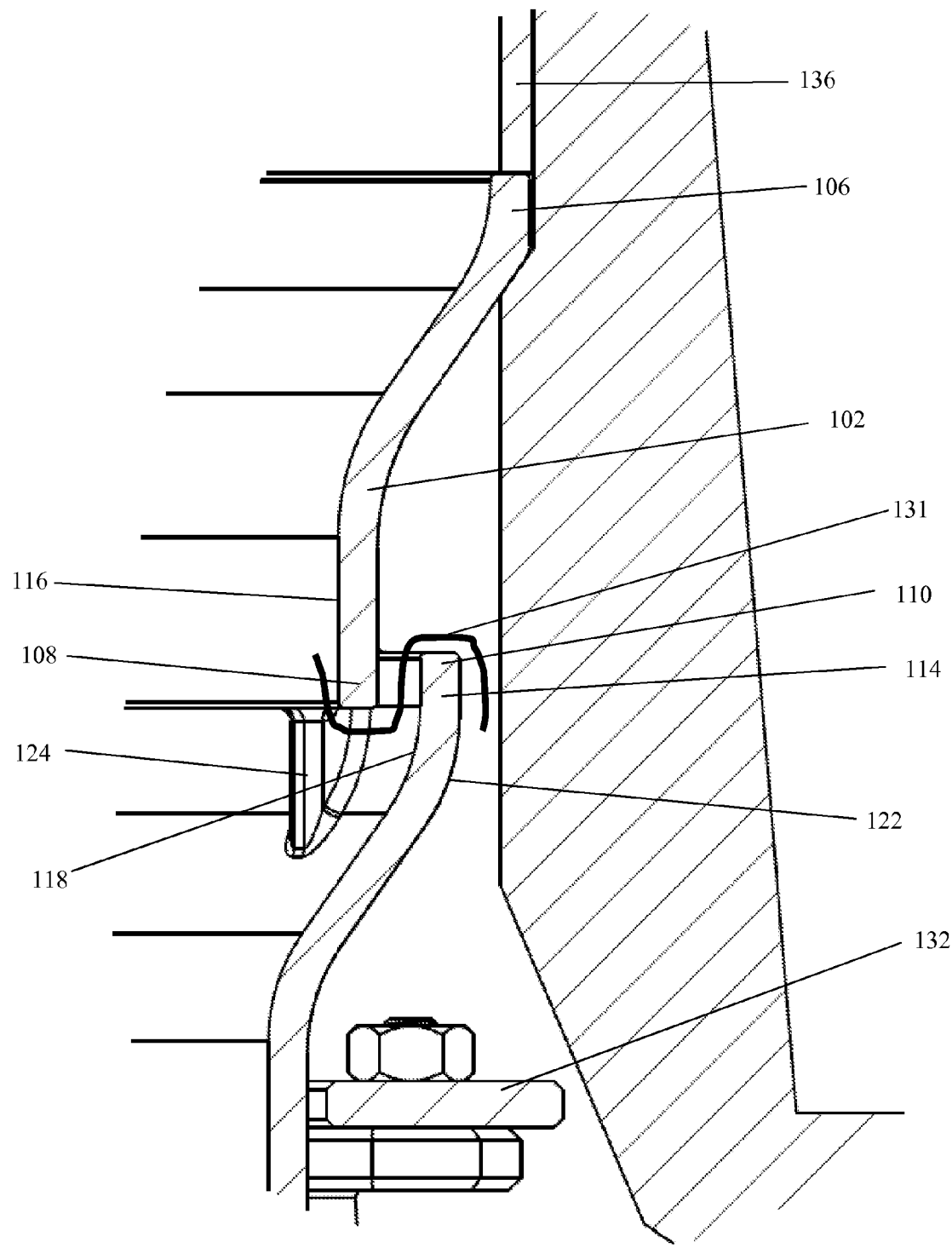
FIG. 6 represents a close-up view of the boundary between a first funnel and a second funnel of the embodiment of the air/water separator shown in FIG. 4.

The arrangement of the first funnel 102 and the second funnel 104 creates a flow pattern that extends down through the interior 116 of the first funnel 102, across the exit 108 of the first funnel 102, up through the space between the interior 118 of the second funnel 104 and exterior 120 of the first funnel 102, across the entry 114 of the second funnel 104 and down the exterior 122 of the second funnel 104. Thus, the flow pattern typically includes two 180° turns. FIG. 6 illustrates the flow path for the embodiment shown in FIG. 4. As discussed in greater detail below, an effect of such a flow path may be to separate water, drops of which cannot make such turns, from air, which can make such turns.

The first funnel 102 and the second funnel 104 may be interconnected in a variety of ways. For example, one or more elements may be arranged in the interior of the second funnel. Along these lines, a plurality of stops 124 may be attached or formed on the inner surface 118 of the second funnel. The first funnel 102 may rest on the rest on the stops 124. The stops and end of the first funnel may engage each other so as to position the first funnel 102 and second funnel 104 with respect to each other and retain them in position.

Additionally, or alternatively, a plurality of ribs 126 may be attached to first funnel 102 and/or the second funnel 104. The ribs and stops may be the same or separate structures. The ribs 126 may position the first funnel 102 and second funnel 104 with respect to each other. The ribs 126 may also strengthen the combined first funnel 102 and second funnel 104. The size and number of ribs 126 may vary, depending upon the embodiment. Since the ribs 126 connect the first funnel 102 and second funnel 104, the first flow path 131 between the first funnel 102 and the second funnel 104 is not present where a rib is present. Therefore, the size and number of ribs 126 may vary depending upon how much flow through the first flow path is desired. Embodiments of ribs 126 are shown in FIG. 4 in cross-section and in FIG. 5 in perspective views.

The first flow path extends between the first funnel 102 and the second funnel 104. A second flow path extends from the first funnel 102 through the second funnel 104. The exit 112 of the second funnel 104 may be closed by a closure 128. Additionally, the lower portion of the second funnel 104 may include at least one exit window 130. The upper surface of the closure 128 may have a conical contour to direct flow to the window(s) 130. The upper surface of the closure 128 could have other contours, such as spherical, planar or include a plurality of regions having different contours. A non-planar closure, such as the conical closure shown in FIG. 4, may help to reduce recirculation in the second funnel 104 and also direct flow toward the at least one window.

As described above, the second funnel 104 may include at least one window 130. Typically, the second funnel includes three windows if utilized with a tri-cone bit. Each window may be arranged so that it directs flow toward the nozzles of the bit.

The at least one window 130 located at or in the vicinity of the base 112 of the second funnel 104 may have any desired size and shape. The size and/or shape may vary depending upon the desired flow through the second funnel 104 and bit in which the air/water separator is incorporated. The embodiment shown in FIGS. 4 and 5 includes three windows, two of which are shown at least partially. The base 130a of the windows 130 is defined by the contour of the exit 112 of the second funnel 104 and closure 128. The embodiments of the windows 130 shown in FIGS. 4 and 5 have vertical side walls 130b and an arched top 130c. However, the window(s) may have other shapes.

Some embodiments may not include windows in the second hollow member, or funnel in this embodiment. Such embodiments would not include a closure at the base of the second hollow member. Rather, the second flow path would extend down through the bottom of the second hollow member.

Figure 5:
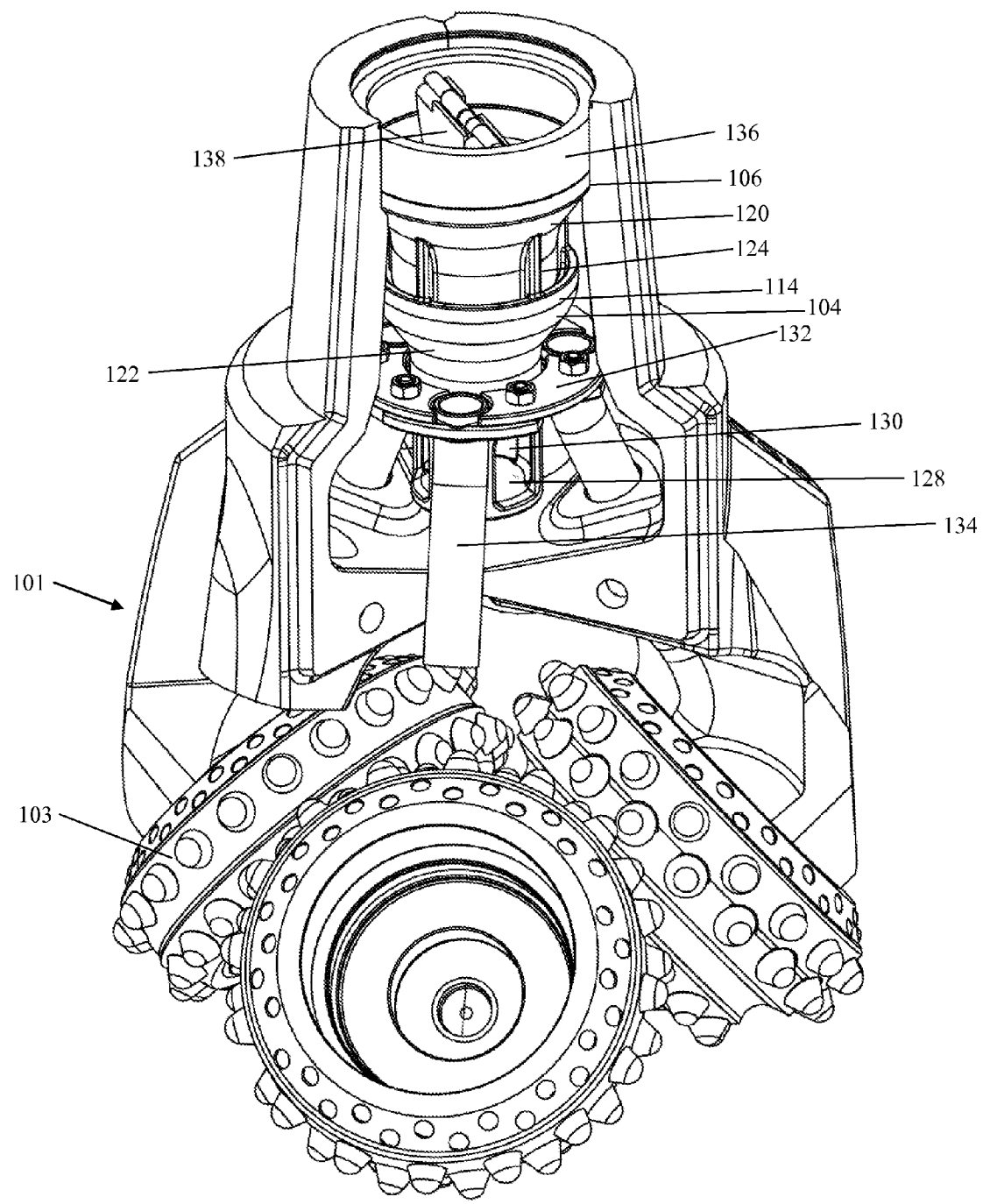
FIG. 5 represents a perspective view of the embodiment of the air/water separator shown in FIG. 4 including a back flow valve assembly.

The air/water separator may include additional flow-directing elements. For example, the embodiment shown in FIGS. 4 and 5 may include a separating ring 132 that helps to direct flow from the first flow path to bearings of a bit with which the air/water separator is utilized. The separating ring may also help to isolate the first flow path from the second flow path. The separating ring may be made of a single unitary ring. Alternatively, the separating ring may include a plurality of ring elements jointed together to form the separating ring 132. For example, FIGS. 4 and 5 illustrate a separating ring including a plurality of ring elements. Segments of ring 132 may be integral with air-tubes 134 or separate pieces, both methods being joined to form a ring.

Figure 7:
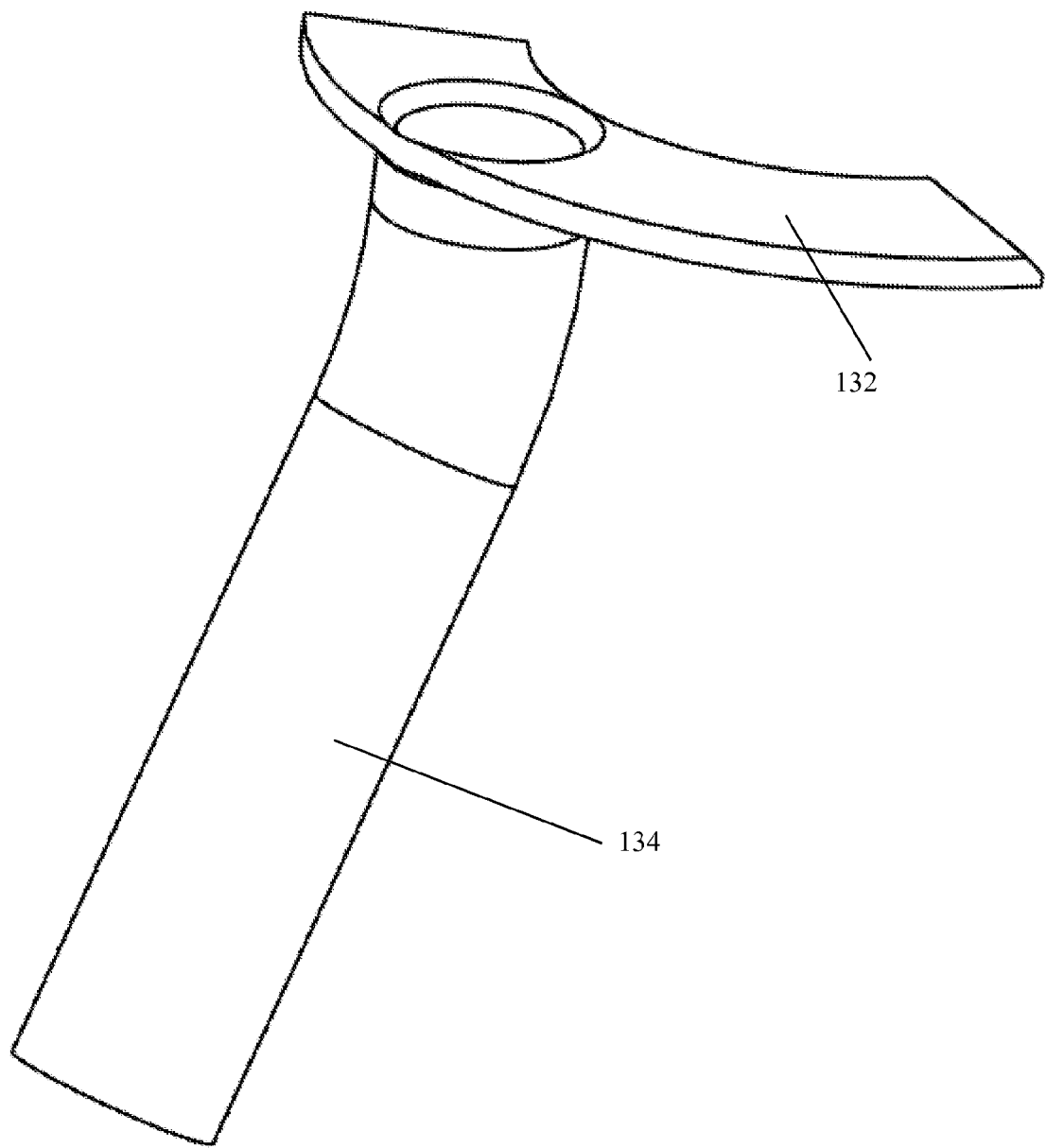
FIG. 7 represents a perspective view of a portion of an embodiment of a separation ring and air-tube.
Figure 8:
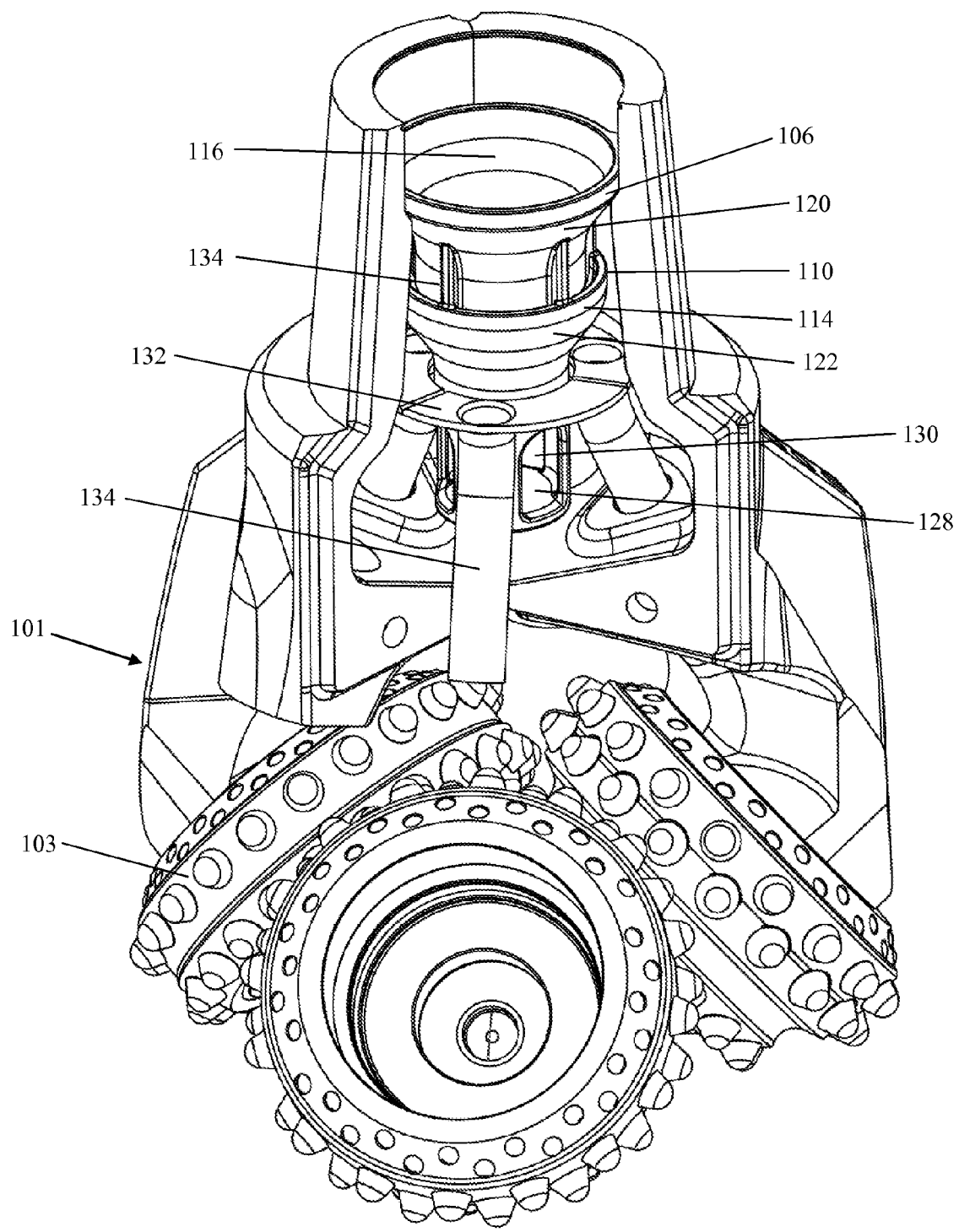
FIG. 8 represents a perspective view of an embodiment of a joint between a drill bit and a drill string.

At least one air-tube 134 may extend from the separating ring 132 toward bearings of a bit with which the air/water separator 100 is utilized. Typically, the air/water separator 100 includes three air-tubes 134 for use with a tri-cone bit. The air-tube(s) may be formed integral with or attached to one or more separating ring elements. One air-tube and integral separating ring element is shown in FIG. 7. The embodiments shown in FIGS. 4 and 5 include non-integral air-tubes and separating ring elements. FIG. 8 illustrates three of the integral air-tube and separating ring elements installed in a bit.

According to the embodiment shown in FIGS. 4 and 5, each air-tube is formed with or connected to a separating ring element. The separating ring elements may be attached to the air-tubes to form a continuous ring between the air-tubes. According to this embodiment, the separating ring elements attached to the air-tubes may be connected by bolts and nuts. The separating ring elements could also be joined by adhesive, welding, or utilizing other techniques.

The separating ring 132 may be attached to the interior surface of a bit with which the air/water separator is utilized. Alternatively, the separating ring 132 could rest on one or more supports within the bit, such as attached to an inside surface of the bit. If the separating ring 132 is attached to the bit, it could be secured with adhesive or welding or any other suitable technique.

FIGS. 7 and 8 provide two views how the air-tubes may include a metal tube with a partial ring welded to the tube. Once installed in the bit, the partial rings could be welded together rather than bolted together as with the embodiment shown in FIGS. 4 and 5. No matter what material is used for the air-tubes and ring, the ring typically cannot be installed as one piece. This is because the ring typically has a larger diameter than the bore through the pin connection of the bit. As a result, the ring is typically divided into three parts, with one part attached to each air-tube. Other embodiments may include a flexible one piece ring.

It may simplify introducing and securing the separating ring and air-tube(s) in the bit if the separating ring includes a plurality of pieces. The separating ring pieces and air-tubes may be separately introduced into the bit and positioned as desired. The separating ring pieces may then be secured to the bit. The second funnel 104 may also be secured to the separating ring/separating ring pieces also.

The funnels, air-tube(s) and retaining ring and any other parts of the air/water separator may be made of a variety of materials. For example, the air-tubes and retaining ring may be made of plastic, including thermoplastic composites. According to such embodiments, funnels, air-tube(s) and retaining ring and any other parts of the air/water separator may be produced with 3-D printing. The parts could also be injection molded. The air-tube(s) and/or retaining ring may be made of metal. The flexibility of materials and methods for manufacturing the air/water separator is due at least in part from the fact that the air/water separator may have no moving parts.

The separating ring separates the first flow, which may be considered the "dry" flow, from the second flow, which may be considered the "wet" flow. While spaces between the separating ring and the second funnel and/or bit interior wall may be made air tight, typically, they are not. This is because a small amount of mixing of the flows due to the spaces not being air tight does not cause separating efficiency losses sufficient to counter the time and cost associated with making the spaces air tight. Rather, the parts are typically designed with enough clearance to be assembled within the bit and to accommodate pressure spikes in either the wet zone or dry zone with a certain clearance between the parts allowing a small amount of communication between them. The small communication between areas also allows for the use of less rigid parts because pressure spikes between the dry and wet zones can equalize rather than push through to the lower pressure region damaging features of the air/water separator.

As shown in FIG. 4, a back flow valve assembly 136 may be arranged at the entry 106 to the first funnel 102. The back flow valve assembly 136 shown in FIGS. 4-6 includes a spring-loaded valve including two valve flaps 138 and 140. The springs bias the valve flaps closed with sufficient force such that if the flow of air and/or water is turned off or reduced below a certain value, the valve flaps will shut. The back flow valve closes if air circulation is lost while drilling or coming out of the hole. The back flow valve maintains a sudden onset of cuttings settling in the hole from coming back inside the bit and plugging airflow passages in the nozzles and bearings.

The air/water separator may be inserted into a pin connection of a rotary bit. The bore of a rotary bit that accepts air/water separator may also receive the back flow valve. Typically, unlike known devices, the air/water separator does not combine air/water separator functionality with back flow valve functionality. The two may remain as separate components available independently or paired together. This may increase configuration options plus greatly simplify the geometry of the air/water separator. Since the air/water separator typically has no moving parts, it is particularly suited for the arduous environment for rock bits. This may also further simplify installing the air/water separator as a drop-in component in rotary bits. Extreme vibrations during drilling can cause pieces to vibrate apart during operation.

Figure 9:
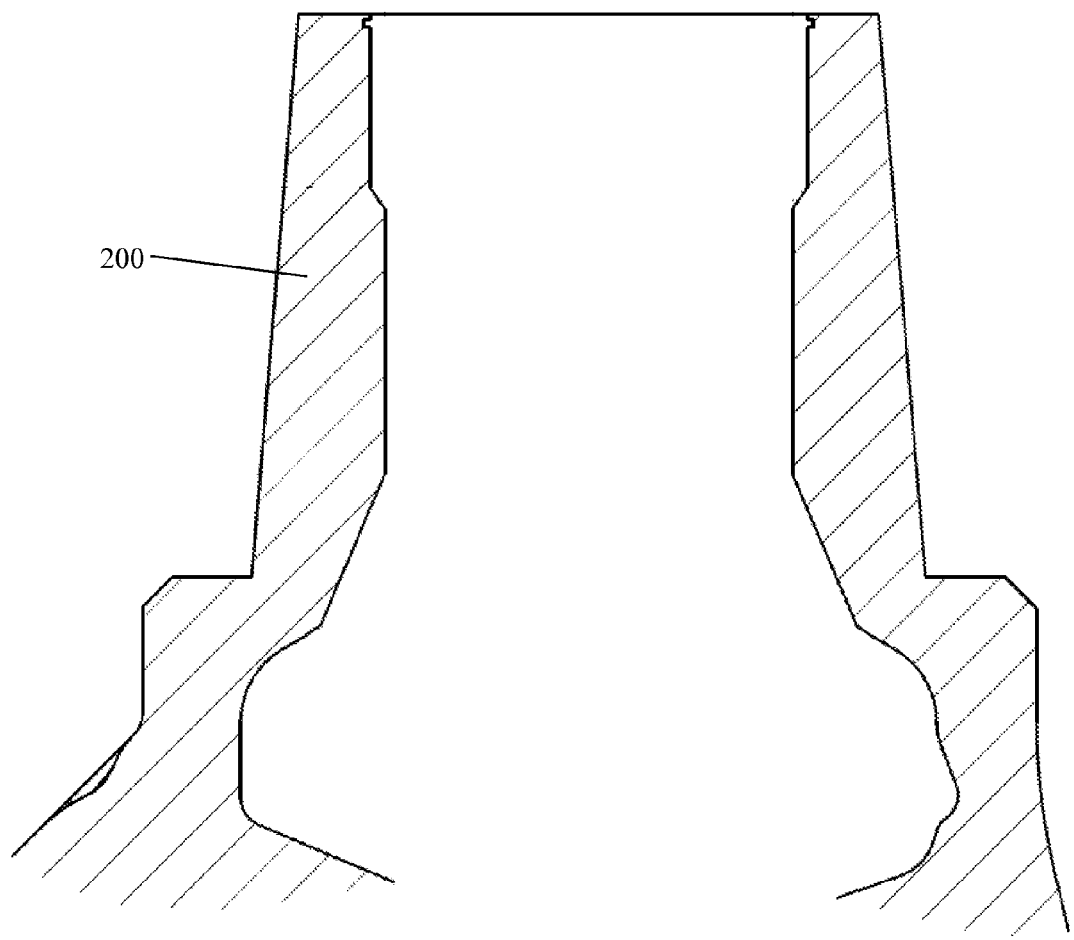
FIG. 9 represents a cross-sectional view of a connection between an embodiment of an air/water separator and a drill string.

The air/water separator may utilize a machined bore in a pin connection to ensure proper clearance around the second funnel for dry air flow and between the retaining ring and the bore to control communication between the dry and wet zones. FIG. 9 illustrates a "universal bit bore" 200 that may receive the air/water separator, air-tubes and the back flow valve.

The air/water separator may be arranged such that an outer surface of the upper funnel engages an inner surface of the bit bore, as shown in FIG. 4. Additionally or alternatively, the base of the lower funnel may rest on a surface within the bit bore. The air-tube(s) extend into and/or receive the air-tubes of the bit, as also shown in FIG. 4. The air/water separator may be attached to the bit, such as with a snap ring or other similar structure. Any other attachment technique could also be utilized, such as welding, adhesive or other mechanical or other techniques. The outer surface or one or more of the funnels may include a tab. One or more grooves having a shape complementary to the tab may be arranged on an inner surface of the bit bore. The tab(s) may engage the groove(s) when the air/water separator is arranged in the bit bore. During operation, the tab(s) and groove(s) may help to prevent the air/water separator from rotating.

The air/water separator includes the first flow path around the exit of the first funnel and entry of the second funnel. This first flow path may actually include two 180° turns. The flow through the first flow path may be accelerated through the first funnel. Water droplets in the flow are too heavy to make the turns between the first funnel and the second funnel, especially at higher velocity. The air/water separator may be utilized with a variety of bits, bit sizes and flow rates. In the embodiment shown in FIG. 4, the air/water separator may be utilized with a flow rate of about 1900 standard cubic feet per minute (SCFM) to about 3800 SCFM.

Figure 10:
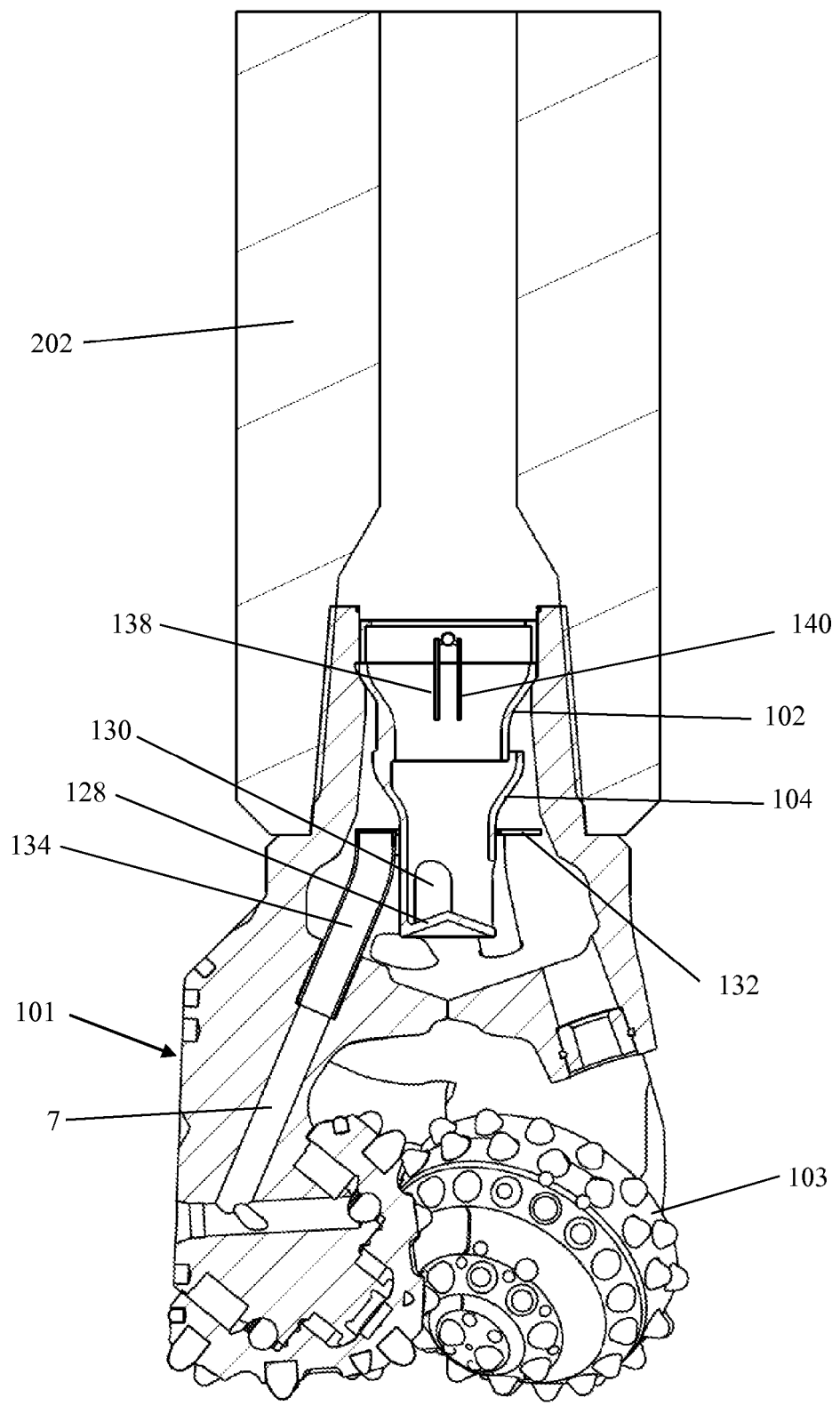
FIG. 10 represents a cross-sectional view of a drill bit including an embodiment of an air/water separator and a portion of a drill string.

As shown in FIG. 6, the bottom of the first funnel and the top of the second funnel overlap axially. If they do not overlap axially and there is direct flow between the first and second funnels to the dry area, then the water will follow the air. The water droplets may fan out upon exiting the first funnel and cylinder. What separates the water is that it cannot make the first or second U-turns so it must keep proceeding down the walls of the second funnel. FIG. 10 illustrates the embodiment of the air/water separator shown in FIG. 4 installed in a bit and attached to a drill string 202.

The air/water separator may also act to help prevent debris, which may include anything other than air, such as rubber from hoses, from entering the drill pipe and the air tubes. For example, air passing through the first flow passage must negotiate the passage between the funnels. Debris, and large debris in particular, typically will not make the turns between the ends and openings of the funnels, similar to water. This will act to prevent debris from passing further through the air/water separators. Additionally, air passing out of the base of the second funnel will need to pass around the separating ring to get to the air tubes. This will also help to prevent debris from reaching the air tubes.

Typically, air tubes are screened to help prevent debris from entering them. Along these lines, the air tube entrances may be slotted, perforated, or otherwise screened to help prevent flow of debris therein. A benefit of the air/water separator is to help prevent debris from reaching the air tubes. As a result, the air tubes may not need any screening structure.

A method for drilling may include providing an air/water separator. The air/water separator may be installed in a drill bit. A backflow valve may also be installed it the bit. The bit may be attached to a drill string and drilling motion applied to the bit. Drill fluid including a combination of air and water flow into the drill string. The air and water may be introduced into the drill bit. The air and water is received in an air/water separator arranged in the pin connection, thereby directing the air and water into a first hollow member and through a second hollow member, wherein an exit of the first funnel extends into an opening of the second hollow member such that the exit of the first hollow member axially overlaps the opening of the second hollow member. A substantial portion of the air is directed through a first flow path from the interior of the first hollow member to the outside of the second hollow member including two turns about the exit of the first hollow member and opening of the second hollow member. A substantial portion of the water flows through a second flow path from the first hollow member through the second hollow member.

The reduced flow areas through the first funnel, between the first and second funnels and through the windows of the second funnel should remain larger than the largest combination of flow areas exiting the bit through the nozzles and bearings. As a result, the bit pressure may be regulated by a typical technique of changing nozzle sizes. If a combined flow area in the air/water separator is smaller than the largest combination of flow areas exiting the bit through the nozzles and bearings, it will determine bit pressure and changing nozzle sizes will not change the bit pressure, until the nozzle size decreased to the point where the bit exit flows are less than the smallest combined flow area in the air/water separator.

The second funnel typically has a smaller flow area than the first funnel so that air is pushed up and around into the dry zone to supply dry air to the bearings. If the first and second funnels have the same flow area, or if the second funnel flow area is larger, then enough flow will not be forced into the dry zone and there will be insufficient air for bearing cooling and cleaning. The second funnel and cylinder should be sized so that the second funnel forces enough air into the dry zone without causing increased back pressure.

At certain times it is necessary to inject larger volumes of water during rotary drilling. This typically does not affect the efficiency of the separator since it is all accelerated through the upper funnel and the lower funnel. Differences between the air/water separator and known devices include that the air/water separator may control back pressure with the flow areas through and around the funnels rather than created by vanes at flat angles and a center dome as in known devices. Additionally, the air/water separator may work over a very wide range of air flow rates. A dust arresting multipurpose adapter (DAMPA) sub must be tuned for specific air volumes, bits and drills. The air/water separator may rely on accelerating the water flow to a higher, straight line velocity through the center so it cannot U-turn twice into the outer dry area rather than centrifuging the water to the outer perimeter like know devices. The air/water separator may be held in place from rotating. No forces are trying to spin the part, but the water windows in the bottom cylinder need to stay aligned with the nozzles for optimal flow through the bit.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. An air/water separator, comprising:
    a first hollow member configured to receive a flow including an air and water mixture the first hollow member having an inlet inner diameter and an exit diameter; and
    a second hollow member configured to receive the flow from the first hollow member, the second hollow member having an inlet inner diameter;
    wherein the inlet inner diameter of the first hollow member is larger than the exit diameter of the first hollow member;
    wherein the exit of the first hollow member extends into the inlet of the second hollow member such that the exit of the first hollow member axially overlaps the inlet of the second hollow member, thereby creating a first flow path from the interior of the first hollow member to the outside of the second hollow member, the first flow path including two 180 degree turns about the exit of the first hollow member and the inlet of the second hollow member, and a second flow path from the first hollow member through the second hollow member.

2. The air/water separator according to claim 1, further comprising:
    a separating ring arranged outside of the second hollow member and downstream of the inlet of the second hollow member, the separating ring separating flow from the first flow path and the second flow path.

3. The air/water separator according to claim 2, further comprising:
    at least one air-tube extending from the separating ring to direct air from the first flow path to bearings of a rotary bit.

4. The air/water separator according to claim 3, wherein the separating ring and at least one air-tube comprise one unitary structure.

5. The air/water separator according to claim 3, wherein the separating ring comprises a plurality of ring sections operatively connected together.

6. The air/water separator according to claim 5, wherein the at least one air-tube comprises a plurality of air-tubes and wherein each ring section is integral with one of the plurality of air-tubes.

7. The air/water separator according to claim 1, further comprising:
    a cap at the exit of second hollow member; and
    at least one window configured to aim flow from the second flow path at nozzles of a rotary bit.

8. The air/water separator according to claim 7, wherein the cap has a conical shape having an apex directed into the second hollow member.

9. The air/water separator according to claim 7, wherein a cross-sectional area of an opening of the at least one window is larger than a cross-sectional area of one of the nozzles of the rotary bit.

10. The air/water separator according to claim 1, further comprising:
    a back flow valve arranged at an entry of the first hollow member.

11. The air/water separator according to claim 1, further comprising:
    strengthening ribs operatively connecting the first hollow member and the second hollow member.

12. The air/water separator according to claim 1, wherein a cross-sectional area of either the exit of the first hollow member or the combined first flow path and second flow path is larger than a cross-sectional area of flow areas exiting through nozzles and bearings of a drill bit.

13. The air/water separator according to claim 1, wherein a base portion of the second hollow member is cylindrical.

14. The air/water separator according to claim 1, wherein a cross-sectional area of the second hollow member is smaller than a cross-sectional area of the first hollow member.

15. The air/water separator according to claim 1, wherein the air/water separator is configured to be received by a pin connection of a rotary drill bit.

16. The air/water separator according to claim 1, wherein the first hollow member and the second hollow member have a cylindrical, funnel-shaped or frustoconically shaped interior surface.

17. A drill bit, comprising:
a pin connection;
an air/water separator arranged in the pin connection, the air/water separator comprising
a first hollow member configured to receive an air and water mixture; and
a second hollow member configured to receive the flow from the first hollow member,
wherein an exit of the first hollow member extends into an opening of the second hollow member such that the exit of the first hollow member axially overlaps the opening of the second hollow member, thereby creating a first flow path from the interior of the first hollow member to the outside of the second hollow member, the first flow path including two turns about the exit of the first hollow member and the opening of the second hollow member, and a second flow path from the first hollow member through the second hollow member; and
wherein a flow through the first flow path is accelerated through the first hollow member.

18. The drill bit according to claim 17, wherein the drill bit is a rotary tri-cone drill bit.

19. A drill bit, comprising:
a pin connection; and
an air/water separator arranged in the pin connection, the air/water separator comprising
a first hollow member configured to receive an air and water mixture; and
a second hollow member configured to receive the flow from the first hollow member,
wherein an exit of the first hollow member extends into an opening of the second hollow member such that the exit of the first hollow member axially overlaps the opening of the second hollow member, thereby creating a first flow path from the interior of the first hollow member to the outside of the second hollow member, the first flow path including two turns about the exit of the first hollow member and the opening of the second hollow member, and a second flow path from the first hollow member through the second hollow member,
wherein the first hollow member comprises a portion having a reduced cross-sectional area along the first flow path; and
wherein the reduced cross-sectional area is configured to reduce the flow area and accelerate the flow through the reduced area.

20. A method for drilling, the method comprising:
directing a combination of air and water into a drill string;
receiving the air and water in a drill bit, comprising a pin connection;
receiving the air and water in an air/water separator arranged in the pin connection, thereby directing the air and water into a first hollow member and through a second hollow member, wherein an exit of the first hollow member extends into an opening of the second hollow member such that the exit of the first hollow member axially overlaps the opening of the second hollow member, such that a substantial portion of the air is directed through a first flow path from the interior of the first hollow member to the outside of the second hollow member, the first flow path including two turns about the exit of the first hollow member and the opening of the second hollow member, and a substantial portion of the water flows through a second flow path from the first hollow member through the second hollow member;
accelerating the air and water through the first hollow member.

* * * * *